United States Patent
Wakasa et al.

(10) Patent No.: US 10,110,728 B2
(45) Date of Patent: Oct. 23, 2018

(54) THEME CHANGE SYSTEM, PORTABLE COMMUNICATION DEVICE, SERVER APPARATUS, AND COMPUTER PROGRAM

(75) Inventors: Shigeki Wakasa, Kanagawa (JP); Jun Ogishima, Tokyo (JP); Daisuke Okada, Chiba (JP)

(73) Assignee: Felica Networks, Inc., Tokyo (JP)

( * ) Notice: Subject to any disclaimer, the term of this patent is extended or adjusted under 35 U.S.C. 154(b) by 1832 days.

(21) Appl. No.: 11/367,433

(22) Filed: Mar. 6, 2006

(65) Prior Publication Data
US 2006/0206590 A1    Sep. 14, 2006

(30) Foreign Application Priority Data

Mar. 10, 2005 (JP) ................................. 2005-067979

(51) Int. Cl.
    *G06F 15/16*    (2006.01)
    *H04M 1/725*    (2006.01)
    (Continued)

(52) U.S. Cl.
    CPC ........ *H04M 1/72563* (2013.01); *G06F 9/445* (2013.01); *H04L 67/04* (2013.01);
    (Continued)

(58) Field of Classification Search
    CPC ............... H04M 1/72544; H04M 1/00; H04M 1/72533; H04M 1/72519; H04M 1/2477;
    (Continued)

(56) References Cited

U.S. PATENT DOCUMENTS 6,091,411 A * 7/2000 Straub ................... G06F 3/0481
                                                              715/703
6,766,353 B1 * 7/2004 Lin ......................... G06F 21/64
                                                              709/201
(Continued)

FOREIGN PATENT DOCUMENTS

JP    10-040083    2/1998
JP    2000-092117    3/2000
(Continued)

OTHER PUBLICATIONS

European Search Report dated Jun. 22, 2006.
(Continued)

*Primary Examiner* — Patrice L Winder
(74) *Attorney, Agent, or Firm* — Michael Best & Friedrich LLP

(57) ABSTRACT

A theme change system includes a portable communication device; and a server apparatus, wherein the portable communication device and the server apparatus are connected to each other via a communication network. The portable communication device includes a theme request section making a request for theme data related to an interface between a user and a process execution part for performing processing in accordance with a request from the user to the server apparatus, a theme management section determining permission and non-permission about the reception of the theme data requested by the theme request section and storing, in a storage section, the theme data, and an interface output section outputting the interface on the basis of the theme data when the process execution part is started or while the process execution part is being started. The server apparatus includes a transmission section transmitting theme data to the portable communication device.

14 Claims, 10 Drawing Sheets

(51) Int. Cl.
*H04L 29/08* (2006.01)
*G06F 9/445* (2018.01)

(52) U.S. Cl.
CPC ......... *H04M 1/72525* (2013.01); *H04L 67/06* (2013.01); *H04M 1/72544* (2013.01)

(58) Field of Classification Search
CPC ......... H04M 1/72569; H04M 1/72563; H04M 1/72525; H04N 1/628; H04N 7/14; G06F 15/16; G06F 9/44; G06F 9/445; H04L 67/04; H04L 67/06
USPC ........................................................ 709/219
See application file for complete search history.

(56) References Cited

U.S. PATENT DOCUMENTS

| | | | | |
|---|---|---|---|---|
| 6,957,393 | B2 * | 10/2005 | Fano et al. ..................... | 715/747 |
| 7,093,198 | B1 * | 8/2006 | Paatero ................. | G06F 9/4443 |
| | | | | 715/746 |
| 7,190,976 | B2 * | 3/2007 | Enns ................. | G06F 17/30905 |
| | | | | 455/566 |
| 7,500,198 | B2 * | 3/2009 | Mathews et al. ............. | 715/744 |
| 7,519,809 | B2 * | 4/2009 | Achanta et al. ............. | 713/100 |
| 7,623,888 | B1 * | 11/2009 | Wolter ....................... | 455/550.1 |
| 2001/0043232 | A1 * | 11/2001 | Abbott ..................... | G06F 1/163 |
| | | | | 715/700 |
| 2002/0039101 | A1 * | 4/2002 | Fernandez .............. | G06F 9/451 |
| | | | | 345/581 |
| 2002/0054086 | A1 | 5/2002 | Van Oostenbrugge et al. | |
| 2002/0062361 | A1 * | 5/2002 | Kivipuro ................. | G06F 21/10 |
| | | | | 709/219 |
| 2002/0137502 | A1 | 9/2002 | Cronin et al. | |
| 2003/0066065 | A1 * | 4/2003 | Larkin ...................... | G06F 8/65 |
| | | | | 717/177 |
| 2003/0078960 | A1 * | 4/2003 | Murren ................... | H04L 29/06 |
| | | | | 709/203 |
| 2003/0120779 | A1 * | 6/2003 | Rodefer ............ | G06F 17/30864 |
| | | | | 709/225 |
| 2003/0231204 | A1 * | 12/2003 | Hanggie ................. | G06T 19/20 |
| | | | | 715/744 |
| 2004/0010786 | A1 * | 1/2004 | Cool ........................ | G06F 8/65 |
| | | | | 717/170 |
| 2004/0056894 | A1 * | 3/2004 | Zaika ..................... | G06F 9/4448 |
| | | | | 715/762 |
| 2004/0056897 | A1 * | 3/2004 | Ueda ..................... | G06F 9/4443 |
| | | | | 715/779 |
| 2004/0083463 | A1 * | 4/2004 | Hawley ................. | G06F 9/4443 |
| | | | | 717/140 |
| 2004/0117439 | A1 * | 6/2004 | Levett ....................... | G06F 9/46 |
| | | | | 709/203 |
| 2004/0204988 | A1 * | 10/2004 | Willers ................. | G06Q 30/02 |
| | | | | 705/14.56 |
| 2004/0216054 | A1 * | 10/2004 | Mathews .............. | G06F 9/4443 |
| | | | | 715/765 |
| 2004/0242281 | A1 * | 12/2004 | Naganuma ............. | G06F 11/28 |
| | | | | 455/566 |
| 2004/0266409 | A1 * | 12/2004 | Nielsen ............. | H04M 1/72525 |
| | | | | 455/414.2 |
| 2005/0010873 | A1 * | 1/2005 | Nakamura ........ | G06F 17/30905 |
| | | | | 715/744 |
| 2005/0014526 | A1 * | 1/2005 | Pan .................... | H04M 1/72575 |
| | | | | 455/550.1 |
| 2005/0021935 | A1 * | 1/2005 | Schillings ................. | G06F 8/60 |
| | | | | 713/1 |
| 2005/0030318 | A1 * | 2/2005 | Ueda ........................ | G09G 5/06 |
| | | | | 345/589 |
| 2005/0050474 | A1 * | 3/2005 | Bells ......................... | G06F 8/38 |
| | | | | 715/747 |
| 2005/0076306 | A1 * | 4/2005 | Martin ................... | G06F 9/4443 |
| | | | | 715/747 |
| 2005/0102380 | A1 * | 5/2005 | Redpath ............ | G06F 17/30876 |
| | | | | 709/220 |
| 2005/0183021 | A1 * | 8/2005 | Allen ..................... | G06F 9/4451 |
| | | | | 715/747 |
| 2005/0193380 | A1 * | 9/2005 | Vitanov ................ | G06F 9/4443 |
| | | | | 717/143 |
| 2005/0245249 | A1 * | 11/2005 | Wierman .................. | G06F 8/61 |
| | | | | 455/419 |
| 2006/0026527 | A1 * | 2/2006 | Bells ................. | H04M 1/72544 |
| | | | | 715/747 |
| 2006/0059430 | A1 * | 3/2006 | Bells ..................... | G06F 3/0484 |
| | | | | 715/747 |
| 2006/0089910 | A1 * | 4/2006 | Kivipuro et al. ................ | 705/50 |
| 2006/0143298 | A1 * | 6/2006 | Anttila .................. | H04M 19/04 |
| | | | | 709/227 |
| 2006/0173911 | A1 * | 8/2006 | Levin ................. | H04M 1/72544 |
| 2006/0199599 | A1 * | 9/2006 | Gupta .................. | H04L 67/125 |
| | | | | 455/466 |
| 2006/0229741 | A1 * | 10/2006 | Achanta et al. ................ | 700/23 |
| 2006/0277416 | A1 * | 12/2006 | Counts et al. ................. | 713/193 |
| 2007/0033254 | A1 * | 2/2007 | Alhusseini .............. | H04L 67/38 |
| | | | | 709/205 |
| 2007/0132746 | A1 * | 6/2007 | Wang et al. ................... | 345/204 |
| 2008/0028326 | A1 * | 1/2008 | Wilson et al. ................. | 715/762 |
| 2009/0309711 | A1 * | 12/2009 | Adappa et al. ................ | 340/501 |
| 2011/0066950 | A1 * | 3/2011 | Wilson et al. ................. | 715/744 |

FOREIGN PATENT DOCUMENTS

| | | |
|---|---|---|
| JP | 2000-112764 | 4/2000 |
| JP | 2000-215040 | 8/2000 |
| JP | 2000-259398 | 9/2000 |
| JP | 2001-265540 | 9/2001 |
| JP | 2002-007138 | 1/2002 |
| JP | 2003-532189 | 10/2003 |
| JP | 2005-056198 | 3/2005 |

OTHER PUBLICATIONS

Japanese Office Action dated Sep. 2, 2008 for corresponding Japanese Application No. 2005-067979.

Chinese Office Action dated Jan. 23, 2009 for corresponding Japanese Application No. 200610092876.9.

* cited by examiner

FIG. 8A  360

| ITEM NAME | REMARKS |
|---|---|
| THEME IDENTIFICATION INFORMATION | INFORMATION FOR IDENTIFYING THEME |
| VERSION | SUPPORT VERSION NUMBER IS DESCRIBED (ALWAYS MOST RECENT VERSION VALUE) |
| ACTUAL DATA ACCESS INFORMATION | REFERENCE TO ACTUAL DATA, SUCH AS ACTUAL IMAGES, SOUND, PHRASES, AND DISPLAY POSITION INFORMATION |

FIG. 8B  354

| ITEM NAME | REMARKS |
|---|---|
| THEME IDENTIFICATION INFORMATION | THIS THEME IS DOWNLOADED AT THE FIRST START-UP |
| VERSION AT WHICH OUTPUT IS POSSIBLE | VERSION OF THEME THAT CAN BE OUTPUT BY THIS APPLICATION |

FIG. 8C  301

| ITEM NAME | REMARKS |
|---|---|
| THEME IDENTIFICATION INFORMATION | USED WHEN VERSION OF THEME NEEDS TO BE UPDATED WHEN THE VERSION OF THIS APPLICATION IS UPDATED |
| THEME VERSION | VERSION OF THEME IS DESCRIBED |
| ACTUAL DATA | DATA, SUCH AS ACTUAL IMAGES, SOUND, PHRASES, AND DISPLAY POSITION INFORMATION |

FIG. 10

| PROCESS NUMBER | APPLICATION DEFINITION FILE STATUS | THEME DEFINITION FILE STATUS | MANAGEMENT FILE STATUS | OPERATION |
|---|---|---|---|---|
| 1 (FIRST START-UP) | DEFAULT | NULL | SPECIFIED VALUE FROM APPLICATION | THEME DOWNLOAD |
|  | 0002 | NULL (OR 0001) | 0002 |  |
| 2 (APPLICATION CHANGE INSTRUCTION) | DEFAULT | DEFAULT | SPECIFIED VALUE FROM APPLICATION | THEME DOWNLOAD |
|  | 0003 | 0002 | 0003 |  |
| 3 (APPLICATION CHANGE INSTRUCTION) | DEFAULT | DEFAULT | SPECIFIED VALUE FROM APPLICATION | NONE |
|  | 0003 | 0003 | 0003 |  |
| 4 (THEME CHANGE INSTRUCTION) | DEFAULT | DEFAULT→01 | SPECIFIED VALUE FROM APPLICATION | APPLICATION DOWNLOAD |
|  | 0003 | 0003 | 0004 |  |
| 5 (THEME CHANGE INSTRUCTION) | DEFAULT | 01→02 | SPECIFIED VALUE FROM APPLICATION | THEME DOWNLOAD |
|  | 0004 | 0004 | 0004 |  |
| 6 (APPLICATION CHANGE INSTRUCTION) | DEFAULT | 02 | SPECIFIED VALUE FROM APPLICATION | THEME DOWNLOAD |
|  | 0005 | 0004 | 0005 |  |

* THE UPPER STEP AND THE LOWER STEP OF EACH OF THE "APPLICATION DEFINITION FILE STATUS", THE "THEME DEFINITION FILE STATUS", AND "MANAGEMENT FILE STATUS" INDICATE A THEME NAME AND A VERSION, RESPECTIVELY.

THEME CHANGE SYSTEM, PORTABLE COMMUNICATION DEVICE, SERVER APPARATUS, AND COMPUTER PROGRAM

CROSS REFERENCES TO RELATED APPLICATIONS

The present invention contains subject matter related to Japanese Patent Application JP 2005-067979 filed in the Japanese Patent Office on Mar. 10, 2005, the entire contents of which are incorporated herein by reference.

BACKGROUND OF THE INVENTION

1. Field of the Invention

The present invention relates to a theme change system, a server apparatus, a portable communication device, and a computer program.

2. Description of the Related Art

At present, between electronic computers, such as personal computers and work stations, and an OS (operation system) incorporated into electrical appliances, such as televisions, the exchange of data is generally performed between an user and apparatuses via an interface, such as a GUI (Graphical User Interface).

In particular, in the field of electronic computers, such as personal computers and work stations, the content of information processing has advanced. Also, the number of parts related to the GUI has increased, and the construction thereof has been complex (refer to, for example, Japanese Unexamined Patent Application Publication No. 2000-215040).

On the other hand, along with the development of the information processing technology, an interface, such as a GUI, has been typically utilized in portable communication devices, such as cellular phones and PDAs (Personal Digital Assistants).

SUMMARY OF THE INVENTION

However, in a portable communication device, since miniaturization is given priority, and processing performance and higher functions are often sacrificed, it is often difficult to process an interface, such as a complex GUI. For example, processing for defining, as a theme, an interface, such as a GUI screen, which is unified and designed and for switching the theme is a typical process in a personal computer. However, in a portable communication device, its processing performance is inferior when compared to a personal computer and the storage capacity thereof is also smaller. As a consequence, it is often difficult to perform the processing.

Therefore, in order to change the above-described theme to another theme, in many cases, it has been necessary to change the theme by interchanging the whole application including the theme with another new application.

The present invention has been made in view of the above-described problems. It is desirable to provide a new and improved theme change system capable of changing a theme on a portable communication device side, a portable communication device for use therewith, a server apparatus for use therewith, and a computer program for use therewith.

According to an embodiment of the present invention, there is provided a theme change system including: a portable communication device; and a server apparatus, wherein the portable communication device and the server apparatus are connected to each other via a communication network, and the portable communication device includes a theme request section making a request for theme data related to an interface between a user and a process execution part for performing processing in accordance with a request from the user to the server apparatus via the communication network, a theme management section determining permission and non-permission about the reception of the theme data requested by the theme request section and storing, in a storage section, the theme data transmitted from the server apparatus via the communication network, and an interface output section outputting the interface on the basis of the theme data when the process execution part is started or while the process execution part is being started, and the server apparatus includes a transmission section transmitting theme data to the portable communication device when the theme data is requested from the portable communication device via the communication network.

According to an embodiment of the present invention, in the theme change system, theme data is requested on the portable communication device side, and when a determination is made as to whether or not the requested theme data can be received, the theme data is received from the server apparatus and then stored in a storage section. With such a configuration, even if the process execution part is not changed to another process execution part, by switching the theme data to another theme data, the interface can be changed to another interface and can be output.

According to another embodiment of the present invention, there is provided a portable communication device capable of communicating with a server apparatus via a communication network. The portable communication device includes a theme request section making a request for theme data related to an interface between a user and a process execution part for performing processing in accordance with a request from the user to the server apparatus via the communication network; a theme management section determining permission and non-permission about the reception of the theme data requested by the theme request section and storing, in a storage section, the theme data transmitted from the server apparatus via the communication network; and an interface output section outputting the interface on the basis of the theme data when the process execution part is started or while the process execution part is being started. With such a configuration, if another theme data is received without changing the process execution part, the interface can be switched to another interface and output.

When a theme version described in the theme data possessed by the portable communication device differs from a version indicating a version at which an interface can be output on the basis of the theme data, the theme request section may make a request for theme data to the server apparatus.

The theme management section may determine permission and non-permission about the reception of the theme data by comparing a theme version corresponding to the theme data possessed by the server apparatus with a version indicating a version at which an interface can be output on the basis of the theme data.

The theme management section may receive a metafile related to the theme data possessed by the server apparatus via the communication network, and it may determine permission and non-permission about the reception of the theme data by comparing a theme version described in the metafile with a version indicating a version at which an interface can be output on the basis of the theme data.

When the theme version described in the metafile is the same as the version at which output is possible or is older than the version at which output is possible, the theme management section may determine that theme data is received from the server apparatus.

The theme management section may replace the existing theme data stored by the portable communication device with the theme data transmitted from the server apparatus. With such a configuration, the storage area can be effectively utilized.

The metafile may contain identification information for identifying the theme data and/or a theme version indicating a version of the theme data.

When the theme data is not stored in the portable communication device, the theme management section may store the theme data transmitted from the theme change system. With such a configuration, the storage size can be reduced.

When a selection of the theme data is accepted from the user on the basis of the identification information for identifying the theme data, the theme request section may make a request for the selected theme data to the server apparatus. With such a configuration, the request for the theme data can be directly performed, unnecessary processing needs not to be performed, and the processing efficiency of the theme request section is improved.

In an attribute definition file for at least defining attributes of the process execution part, a version indicating a version at which an interface output section can output an interface may be described.

The interface output section may output the interface by comparing the version at which output is possible with the theme version indicating the version of the theme data. Examples of the output can include a case in which the version at which output is possible and the theme version are the same as each other or the theme version is an older version.

The theme data may contain a theme definition file for defining the above-described theme and actual data for outputting an interface related to the theme. The theme definition file may be formed in such a manner that a theme version indicating the version of the theme data and identification information by which the theme data can be identified are described therein.

The version at which output is possible may also serve as a process execution part version indicating the version of the process execution part. Examples of the process execution part can include an application.

According to another embodiment of the present invention, there is provided a server apparatus capable of communicating with a portable communication device via a communication network. The server apparatus includes a transmission section for transmitting the theme data to the portable communication device when theme data related to an interface between an user and a process execution part for performing processing in accordance with a request from the user is requested from the portable communication device via the communication network.

When theme data is requested from the portable communication device, the transmission section may transmit a metafile related to the theme data to the portable communication device.

The metafile may contain identification information for identifying the theme data and/or a theme version indicating the version of the theme data. An example of the identification information can include a theme name that is the name of theme data.

According to another embodiment of the present invention, there is provided a computer program for enabling a computer to function as a portable communication device capable of communicating with a server apparatus via a communication network. The computer program includes the steps of: making a request for theme data related to an interface between an user and a process execution part for performing processing in accordance with a request from the user to the server apparatus via the communication network; determining permission and non-permission about the reception of the theme data requested by the theme request section and storing, in a storage section, the theme data transmitted from the server apparatus via the communication network; and outputting an interface on the basis of the theme data when the process execution part is started or while the process execution part is being started.

According to another embodiment of the present invention, there is provided a computer program for enabling a computer to function as a server apparatus capable of communicating with a portable communication device via a communication network. The computer program includes the step of transmitting the theme data to the portable communication device: when theme data related to an interface between a user and a process execution part for performing processing in accordance with a request from the user is requested from the portable communication device via the communication network.

BRIEF DESCRIPTION OF THE DRAWINGS

FIGS. 8A, 8B, and 8C are illustrations schematically showing the data structure according to an embodiment of the present invention;

FIG. 10 is a illustration schematically showing a variation of the theme change process according to an embodiment of the present invention.

DESCRIPTION OF THE PREFERRED EMBODIMENTS

Figure 1:
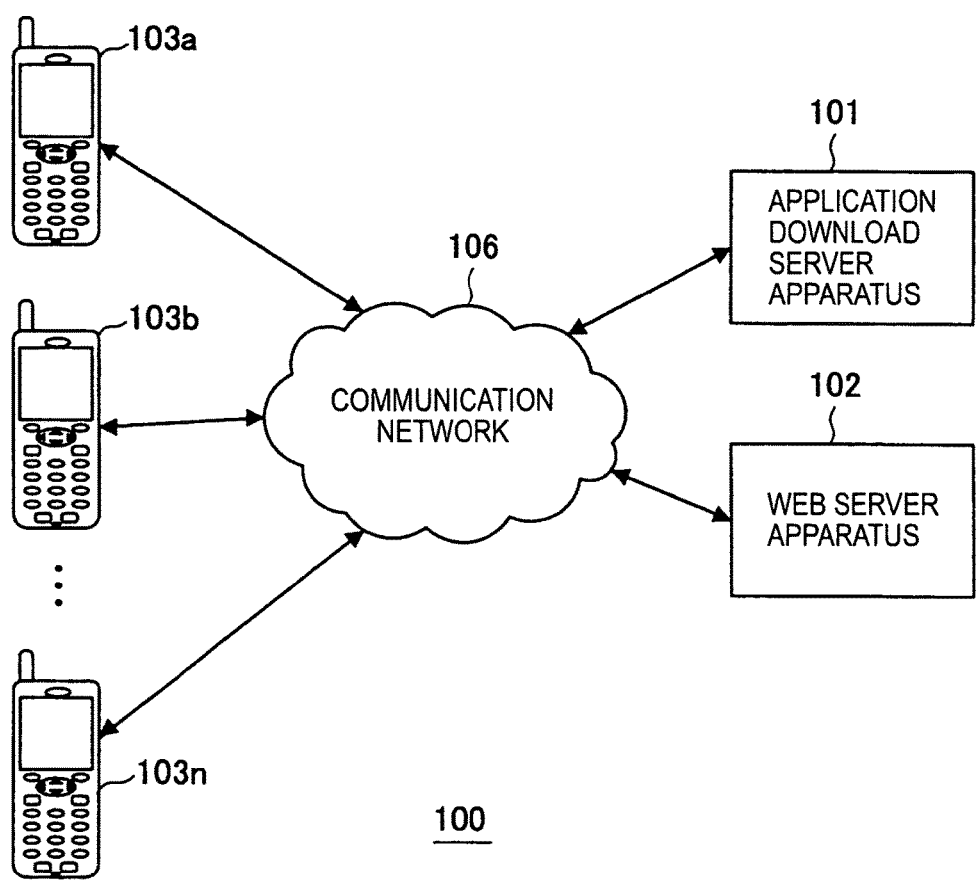
FIG. 1 is a block diagram showing the configuration of a theme change data system according to an embodiment of the present invention.

Preferred embodiments of the present invention will now be described below in detail with reference to the drawings.

In the following description and the attached drawings, components having substantially the same functions and configuration are designated with the same reference numerals, and descriptions thereof are not repeated here.

Theme Change System

First, with reference to FIG. 1, a theme change system 100 according to an embodiment of the present invention will be described. FIG. 1 is a block diagram showing the configuration of the theme change system according to this embodiment.

As shown in FIG. 1, the theme change system 100 includes, via a communication network 106 such as the Internet, one or more portable communication devices 103a (hereinafter referred to collectively as a "portable communication device 103"), an application download server apparatus 101 (hereinafter referred to as an "AP server 101"), and a Web server apparatus 102 (hereinafter referred to as a "Web server 102").

The portable communication device 103 according to this embodiment has data communication functions, can access the AP server 101 or the Web server 102 via the communication network 106, and can receive data from the server.

In the portable communication device 103, an application (process execution part) capable of performing a predetermined process, such as data communication, is stored in such a manner that it can be executed. Therefore, as a result of the application being executed, upon receiving an execution instruction from a user, the portable communication device 103 can perform a predetermined process, such as accessing the server.

Some applications stored in the portable communication device 103 in such a manner as to be capable of being executed are stored in advance, and also some applications are stored in the portable communication device 103 as a result of being distributed from the AP server 101. Furthermore, in some cases, an application that is already stored in the portable communication device 103 is changed (the version is updated) to an application whose version is new (progressed).

For the updated version of the application, mainly, a new application is transmitted from the AP server 101 to the portable communication device 103. The updated version is not limited to such an example, and, for example, the application may be stored in the portable communication device 103 via a storage medium, such as a flash memory, in which a new application is stored.

The Web server 102 is a server for providing Web page browsing services. More specifically, when a Web page is requested from a browser stored in the portable communication device 103 in such a manner as to be capable of being executed, the Web server 102 transmits the specified Web page data to the target portable communication device 103.

The AP server 101 is a server apparatus in which applications, themes, and the like to be transmitted to the portable communication device 103 are stored. That is, if there is a request for an application or a theme from the portable communication device 103, the specified application data, the specified theme data, and the like can be transmitted to the portable communication device 103.

It is assumed that the application data contains actual data of the application itself and an attribute definition file in which attributes of the application are defined. Furthermore, the theme data contains the actual data, such as an image or sound, related to the theme and a theme definition file for defining the target theme. The theme definition file and the attribute definition file will be described later in detail.

In the theme change system 100, the theme of the application that operates in the portable communication device 103 can be changed. The theme change will be described in detail later. Mainly, there is a case in which a theme is changed as part of a series of processing of changing (or updating the version) the application or a case in which the portable communication device 103 directly receives an instruction from the user to change the theme. Similarly to the application, for the theme, also, a concept of a version exists. Hereinafter, a version related to, in particular, a theme is referred to as a theme version.

As details will be described later, for the theme change, there are a theme change that occurs as a result of updating the version of a theme and a theme change of changing identification information, such as the theme name, in which the version related to the theme is the same (no version up) and, for example, the theme is changed to another kind of theme.

An example of the theme change of changing the theme to another kind of theme can include a case in which the theme is changed to a different one in one of, for example, a color, a pattern, a tempo (related to sound, etc.), a font style, or a figure. More specifically, an example of a case in which a screen theme in which light blue is the main trend is changed to a screen theme in which color yellow is the main trend can be shown.

Here, access in this specification collectively refers to information processing, for example, the portable communication device 103 uses the system; the portable communication device 103 makes a connection to the AP server 101 or the Web server 102; the cellular phone 103, the AP server 101, or the Web server 102 itself refers to the possessed data (or reads data), stores data (or writes data separately), deletes data, or updates data (or writes data by overwriting).

The theme referred to herein is a unified design related to an interface introduced to an apparatus (or an application by which the apparatus operates), such as a portable communication device. Examples of the output destination (the representation destination) to which the interface is output can include a screen or a speaker. The theme data is data for outputting (or representing) an interface designed by the theme.

Examples of the above-described interface that is designed in a unified manner include an interface that is classified into the screen, the sound, the characters, etc. of the apparatus and in which each is designed in a unified manner (hereinafter referred to as a "screen theme", a "sound theme", or a "character theme"), and an interface in which the whole of the screen, the sound, the characters, etc. of the apparatus are designed in a unified manner (hereinafter referred to as a "whole theme").

In the following, unless otherwise particularly specified, when the theme is simply described as a theme, the theme is assumed to collectively refer to a theme, such as the screen theme, the sound theme, the character theme, and the whole theme. The interface according to this embodiment is not limited to such examples and may be any user interface (hereinafter referred to as "UI") in which the user and the apparatus are in contact with each other.

On the other hand, it is possible for the portable communication device 103 to access the Web server 102 by starting up and executing a Web page browser (hereinafter referred to as a "browser") used for the user to browse Web pages installed into the portable communication device 103.

When the browser makes a request for Web pages stored in the Web server 102 and obtains the Web pages from the Web server 102, the browser can output them to the screen, etc. The Web page browser is one kind of the above-described applications.

In the theme change system 100 according to this embodiment, a communication between the portable communication device 103 and the AP server 101 or the Web server 102 may be performed securely as necessary by, for example, SSL (Secure Socket Layer).

The Web page may be any data as long as it can be output to the screen or the like by the browser of the portable communication device 103. The Web page is written by a mark-up language, such as, for example, HTML (Hyper Text Markup Language), XML (eXtensible Markup Language), or CHTML (Compact HTML) that is downward compatible with the HTML.

It is assumed that the Web page contains text data written by the above-described CHTML, still image data, moving image data, sound data, Java applets, or theme data.

Therefore, if the Web server 102 stores the theme data and the theme data is requested from the browser of the portable communication device 103, it is possible to perform the theme change in place of the AP server 101.

The communication network 106 according to this embodiment is designed to connect the portable communication device 103, the AP server 101, and the Web server 102 with one another in such a manner as to be capable of mutually communicating in a bidirectional manner. The communication network 106 is a public network, such as the Internet, and also includes a closed network, such as a WAN, a LAN, and an IP-VPN. Furthermore, the connection medium includes an optical fiber cable by FDDI (Fiber Distributed Data Interface), a coaxial cable, a twisted pair cable by Ethernet, or a wireless connection by IEEE 802.11b, without being concerned about being a wireless connection or a wired connection, and also a satellite communication network.

The communication network 106 includes base stations for receiving radio waves from the portable communication device 103 and gateways for converting a signal from the portable communication device 103 into packet data or for performing the reverse thereof. Therefore, even when the portable communication device 103 is a device having a wireless communication function of a cellular phone, it is possible to communicate with the AP server 101 or the Web server 102. The portable communication device 103 is not limited to such an example, and even when the portable communication device 103 is a device having a wired communication function of other than a cellular phone, it is possible to communicate with the AP server 101 via the communication network 106.

Theme Change

Figure 2:
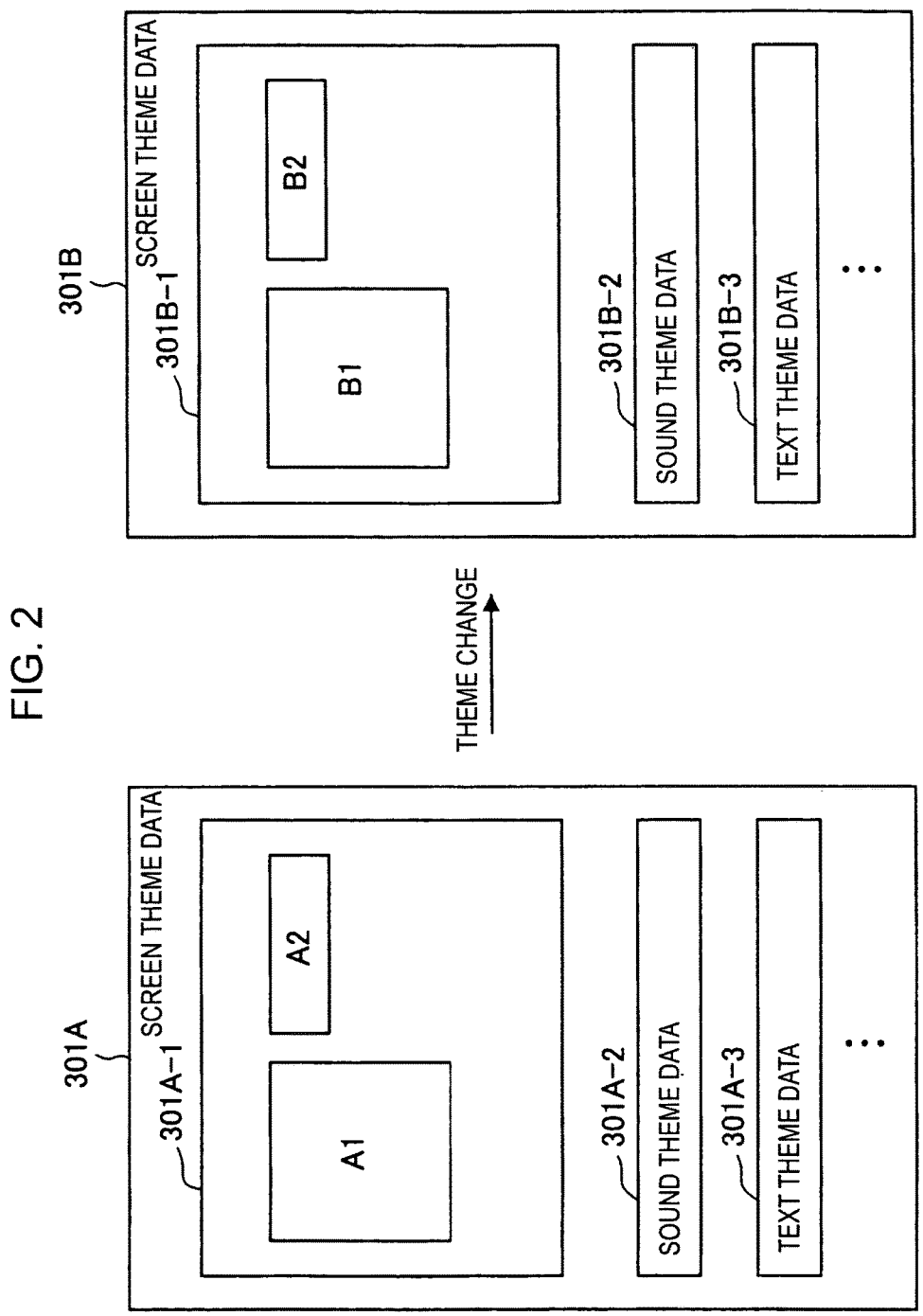
FIG. 2 is a illustration showing the outline of a theme change data according to an embodiment of the present invention.

Next, with reference to FIG. 2, a description will be given of the outline of a theme change according to this embodiment. FIG. 2 is an illustration showing an example of the outline of a theme change according to this embodiment.

In a storage section 258 provided in the portable communication device 103, theme data 301 is stored. During the initial start-up of the portable communication device 103, there can be a case in which the theme data 301 does not exist in the storage section 258.

As shown in FIG. 2, in the storage section 258 provided in the portable communication device 103, theme data 301A is stored. The theme data 301A can be classified into a plurality of pieces of theme data, that is, screen theme data 301A-1 corresponding to a screen theme, sound theme data 301A-2 corresponding to a sound theme, and text theme data 301A-3 corresponding to a character (text) theme.

As described above, the theme data 301 contains a theme definition file and actual data related to themes. In the theme definition file, identification information (for example, a theme name) by which a theme can be identified, a theme version indicating the version of a theme, and the like, are described.

For example, in the screen theme data 301A-1 shown in FIG. 2, actual data corresponding to a window image, such as a window A1 and a window A2, is contained. In addition, actual data corresponding to an image, such as the menu bar, the check box, or the title bar (not shown), is contained. Furthermore, a theme definition file for defining them is also contained.

The screen theme data 301A-1 shown in FIG. 2 is data about an interface in which icons, windows, etc., which are output onto the screen of the output section 260, are designed in a unified manner. Similarly, the sound theme data 301A-1 is data about an interface in which sound, such as sound effects and a sound guide, which are output to the speaker of the output section 260, is designed in a unified manner. Furthermore, the text theme data 301A-3 is data about an interface in which the font style, the size, etc. of characters displayed on the screen of the output section 260 are designed. The sound effects are sounds for causing the user to pay attention when an icon is clicked. The sound guide is used to illustrate the content of the selected menu bar using voice.

When the application corresponding to the theme data 301A is started up, themes, such as a screen theme and a sound theme, are output to the screen and the speaker of the output section 260 on the basis of the theme data 301A.

When the theme of the theme data 301A is changed as shown in FIG. 2, the theme data 301A can be changed to theme data 301B. The theme change can be performed if an instruction of the theme change from the user or an instruction for updating the version of the application is accepted via the input section 262.

Applications and Themes

Figure 3:
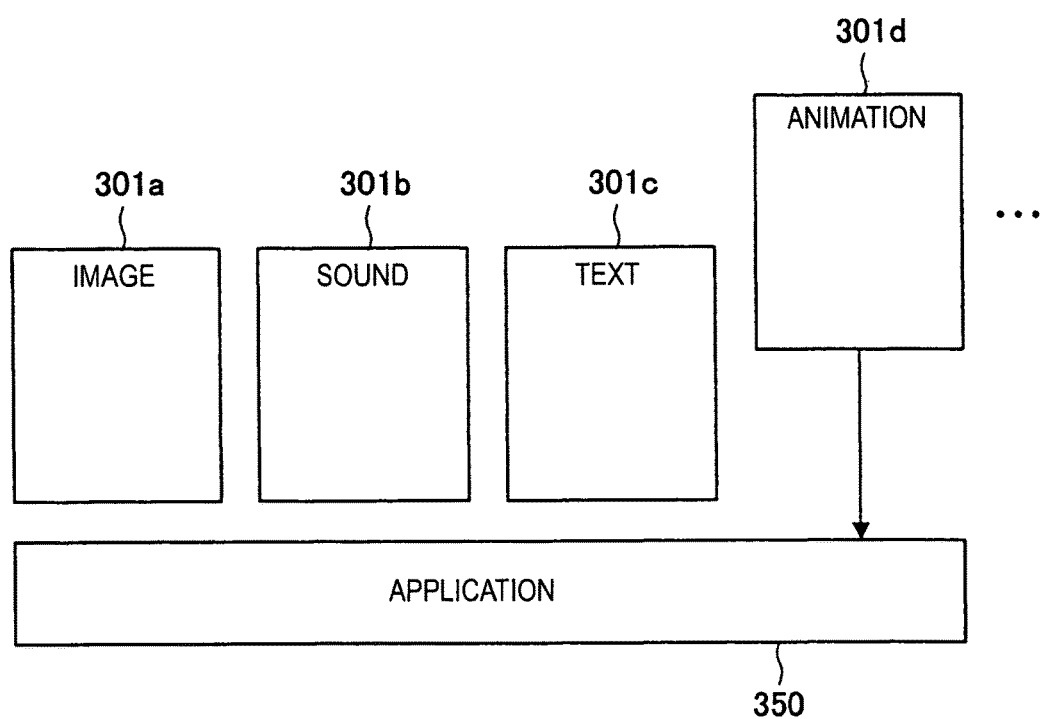
FIG. 3 is a schematic diagram showing the relationship between applications and themes according to an embodiment of the present invention.

Next, a description will be given of the outline of the relationship between an application and themes according to this embodiment with reference to FIG. 3. FIG. 3 is a schematic diagram showing the relationship between an application and themes according to this embodiment.

As shown in FIG. 3, on the basis of an application 350, a screen theme 301a, a sound theme 301b, a text theme 301c, and one or more themes exist. As shown in FIG. 3, by newly incorporating an animation theme 301d into the application 350, an interface related to a moving image can be designed in a unified manner. Conversely, it is also possible to selectively delete only the theme that becomes unnecessary.

In particular, as shown in FIG. 3, the application 350 according to this embodiment is not integral with the theme 301 and is separated therefrom. Therefore, even if the version of the application 350 itself is updated, no influence needs to be exerted at all on the theme 301. Conversely, even if the theme 301 is changed, no influence needs to be exerted at all on the application 350.

Examples of exerting an influence described above can include the fact that the version of an application definition file (or the attribute definition file) related to the application 350 is updated and the fact that the theme version described in the theme definition file is updated as a result of the version up of the application 350.

Portable Communication Device

Figure 4:
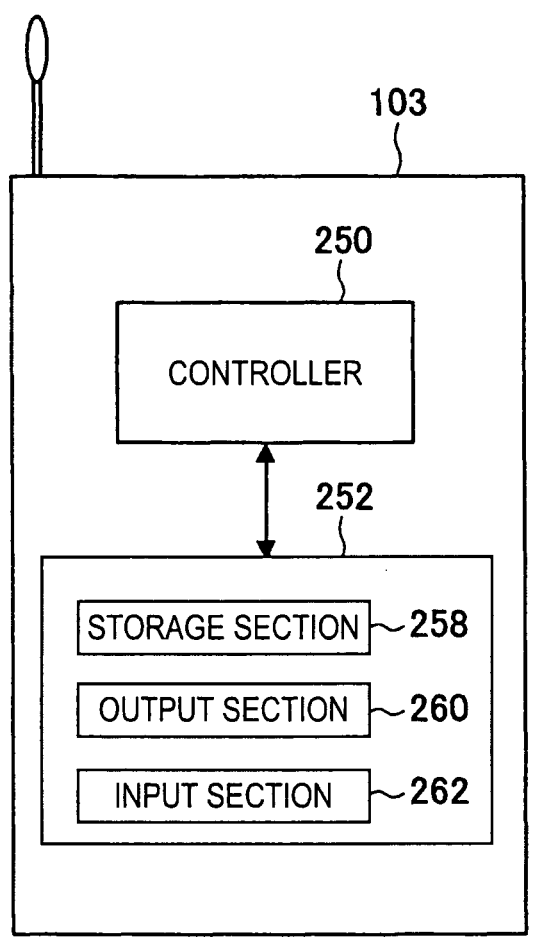
FIG. 4 is a block diagram showing an example of the schematic configuration of a portable terminal according to an embodiment of the present invention.

Next, a description will be given, with reference to FIG. 4, of the portable communication device 103 according to this embodiment. FIG. 4 is a block diagram showing an example of the schematic configuration of a portable terminal according to this embodiment.

As shown in FIG. 4, the portable communication device 103 includes a controller 250 and a cellular phone circuit 252. The portable communication device 103 according to this embodiment will be described by using as an example a case in which it is a cellular phone. The portable communication device 103 is not limited to such an example and needs only be capable of communicating in a wireless or wired manner. Examples of the portable communication device 103 can include a PDA and a portable storage device capable of playing back music and/or video.

The controller 250 controls the overall apparatus, such as starting up an application, instructing the application to execute processing, and displaying information on the screen.

The cellular phone circuit 252 includes a storage section 258, an output section 260, and an input section 262. In the storage section 258, for example, an application, such as a browser, a theme definition file, an attribute definition file for defining attributes of applications, or the like are stored. Details of these components will be described later.

The output section 260 outputs a screen, a sound, and the like that are processed by an application in such a manner as to be capable of being output on the basis of the theme definition file. More specifically, the output section 260 corresponds to a display, a speaker, or the like. Such output by the output section 260 enables a user to view a Web page, etc. It is also possible for the output section 260 to output, in addition to a still image, a sound or a moving image or the combination thereof.

The input section 262 is formed of, for example, operation means, such as buttons, a joystick, a jog dial, a keyboard, a switch, a lever, and pointing devices, such as a mouse, a trackball, a trackpad, and/or a stylus pen.

Application

Figure 5:
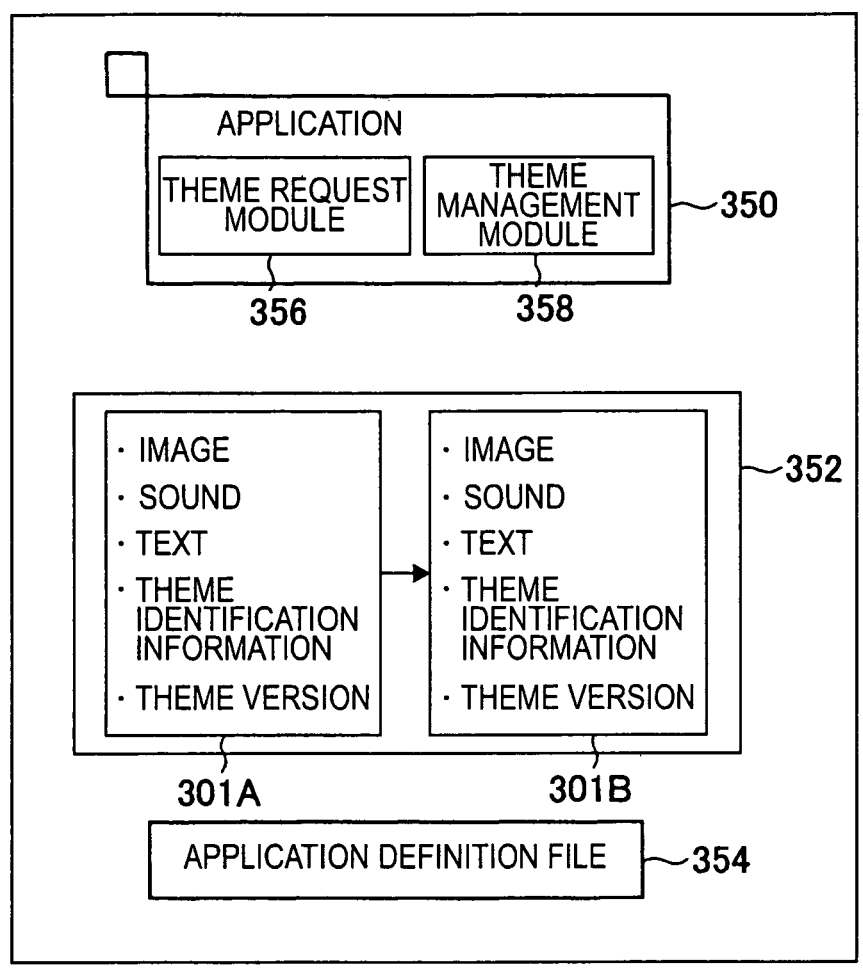
FIG. 5 is a illustration schematically showing the structure of data stored in a storage section according to an embodiment of the present invention.

Next, with reference to FIG. 5, a description will be given of data of applications, etc., which is stored in the storage section 258 according to this embodiment. FIG. 5 is an illustration schematically showing the structure of the data stored in a storage section according to this embodiment.

As shown in FIG. 5, in the storage section 258, an application 350, theme data 301 containing a theme definition file, and an application definition file (attribute definition file) 354 in which attributes of the application 350 are defined are stored.

The theme data 301 is stored in a storage area 352, which is one of the storage areas. Examples of the storage area 352 can include a storage area, such as a scratch pad.

In the storage area 352 according to this embodiment, one piece of the theme data 301 is stored. For example, when the theme data 301A is changed to another theme data 301, such as the theme data 301B, the existing theme data 301 is replaced with new theme data 301. The storage area 352 is not limited to such an example and can also be embodied in such a manner that, for example, when a plurality of pieces of the theme data 301 can be stored in the storage area 352 and the theme is to be changed, the theme data 301 stored in the storage area 352 is switched to another theme data 301.

The application definition file 354 is a file for defining attributes of the application 350. In the application definition file 354, for example, a theme version (or the version at which output is possible) indicating the version of the theme that can be output by the application 350, identification information (a theme name and the like) for identifying that theme, etc. are described. Examples of the application definition file 354 can include an ADF file, a JAM file, etc. The version at which output is possible (or the theme version) described in the application definition file 354 according to this embodiment will be described below by using as an example a case in which the application definition file 354 also serves as an application version indicating the version of the application 350. The application definition file 354 is not limited to such an example and can be embodied, for example, even when the version at which output is possible and the application version are described in the application definition file 354. This applies the same for the version of a management file 360, which will be described later.

The application 350 is application software capable of executing one or more kinds of processing. Furthermore, the application 350 contains a theme request module 356 for making a request for theme data containing a theme definition file to the AP server 101 and a theme management module 358 for storing theme data in the storage section 258.

The application 350 also has a browsing function. When the application 350 accepts a request for displaying the screen of a Web page from the input section 262, the application 350 requests Web page data from the Web server 102. The module that makes a request for a Web page is a page request module (not shown) contained in the application 350.

In the application 350, a page reading module (not shown) is contained. The page reading module reads the Web page transmitted from the Web server 102 and determines the layout of a Web page to be displayed on the screen, such as the font style of characters, the size of the image, and the position at which that image is positioned, on the basis of the content of tags embedded in the Web page.

As a result of conforming to the tags interpreted by the page reading module, it is possible for the page output module to display a moving image, text or the like on the screen of the output section 260.

The application 350 according to this embodiment will be described below by using as an example a case in which it is, for example, a program composed of one or more modules or components. The application 350 is not limited to such an example and may be, for example, hardware formed of one or more circuits.

Application Download Server Apparatus

Figure 6:
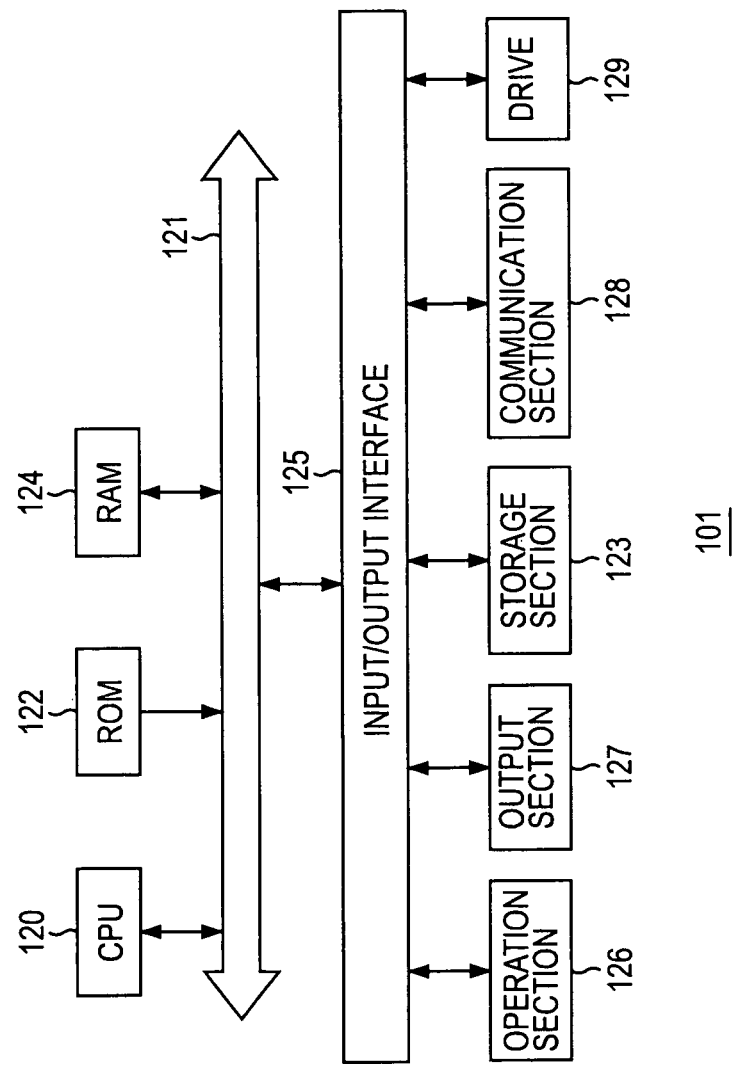
FIG. 6 is a block diagram schematically showing the configuration of an application download server apparatus according to an embodiment of the present invention.

Next, with reference to FIG. 6, a description will be given in detail of the configuration of an application download server apparatus (AP server) 101 according to this embodiment. FIG. 6 is a block diagram schematically showing the configuration of the application download server apparatus according to this embodiment.

As shown in FIG. 6, the AP server 101 includes, for example, a CPU 120, a ROM 122, a RAM 124, an operation section 126, an output section 127, a storage section 123, a communication section 128, and a drive 129.

The CPU 120 functions as a processing unit and a control unit, and it can control processing of each section provided in the AP server 101.

The ROM 122 or the RAM 124 has functions for temporarily storing various kinds of data related to processing performed by the CPU 120 and an application, such as a browser currently being started up. The operation section 126 and the output section 127 are substantially the same as the input section 262 and the output section 260, respectively, provided in the portable communication device 103, and detailed descriptions thereof are not repeated here.

The communication section (the transmission section and the reception section) 128 is a communication interface formed of communication circuits, communication devices, and the like. This communication section 128 can transmit and receive various kinds of data, such as theme data containing a theme definition file and a Web page, to and from the portable communication device 103 or the Web server 102 over the network.

The drive 129 is a device capable of reading data recorded on a recording medium, such as a flash memory, a FD, a CD, and a DVD, or writing data on a recording medium. Therefore, if the drive 129 reads a program and the like recorded on a recording medium, such as a CD or a DVD, it can be installed into the storage section 123 in such a manner for the CPU 120 to execute it.

The storage section 123 is a storage device for storing data, which is formed of, for example, a hard disk drive, a flash memory, or the like. In the storage section 123, one or more kinds of applications (application programs), one or more kinds of theme definition files, actual data such as one or more kinds of images and sound, and a management file (metafile) corresponding to the above two, and the like are stored. The above-described application and the theme definition file may be stored for each version. Furthermore, in the application, an attribute definition file for defining attributes of the application exists. There is a case in which data containing, in particular, an application itself (actual data) and an application definition file (or the attribute definition file) thereof is referred to as application data.

In the storage section 123, an application for performing a process in which the portable communication device 103 responds to access via the communication network 106 is stored. Such an application enables a management file of the theme definition file requested from the portable communication device 103 to be transmitted and enables theme data or the like to be transmitted. The above-described application is a program in compliance with the Web page providing application stored in the Web server 102 (to be described later).

Next, the Web server 102 according to this embodiment will be described briefly. Similarly to the AP server 101 described above, the Web server 102 also includes a CPU, a ROM, a RAM, an operation section, an output section, a communication section, and a storage section.

The storage section (not shown) provided in the Web server 102 is substantially the same as the storage section 123 provided in the AP server 101. Examples of the data stored by the storage section provided in the Web server 102 can include a Web page providing application for providing Web pages to the portable communication device 103, a database (Web page DB) related to the Web pages, a theme definition file, and a metafile (management file) related to the theme definition file.

As a result of the Web page providing application being started up, when a theme definition file linked to a Web page is requested on the basis of the Web page from the portable communication device 103, the Web page providing application obtains a theme definition file and actual data, such as an image corresponding to the theme definition file. Then, it is possible for the communication section to transmit theme data containing the theme definition file to the portable communication device 103, and it is possible for the portable communication device 103 to change a theme related to the UI (user interface).

The Web page providing application according to this embodiment will be described later by using as an example a case in which the Web page providing application is a program composed of one or more modules and components. The Web page providing application is not limited to such an example and may be, for example, hardware formed of one or more circuits.

Management File

Figure 7:
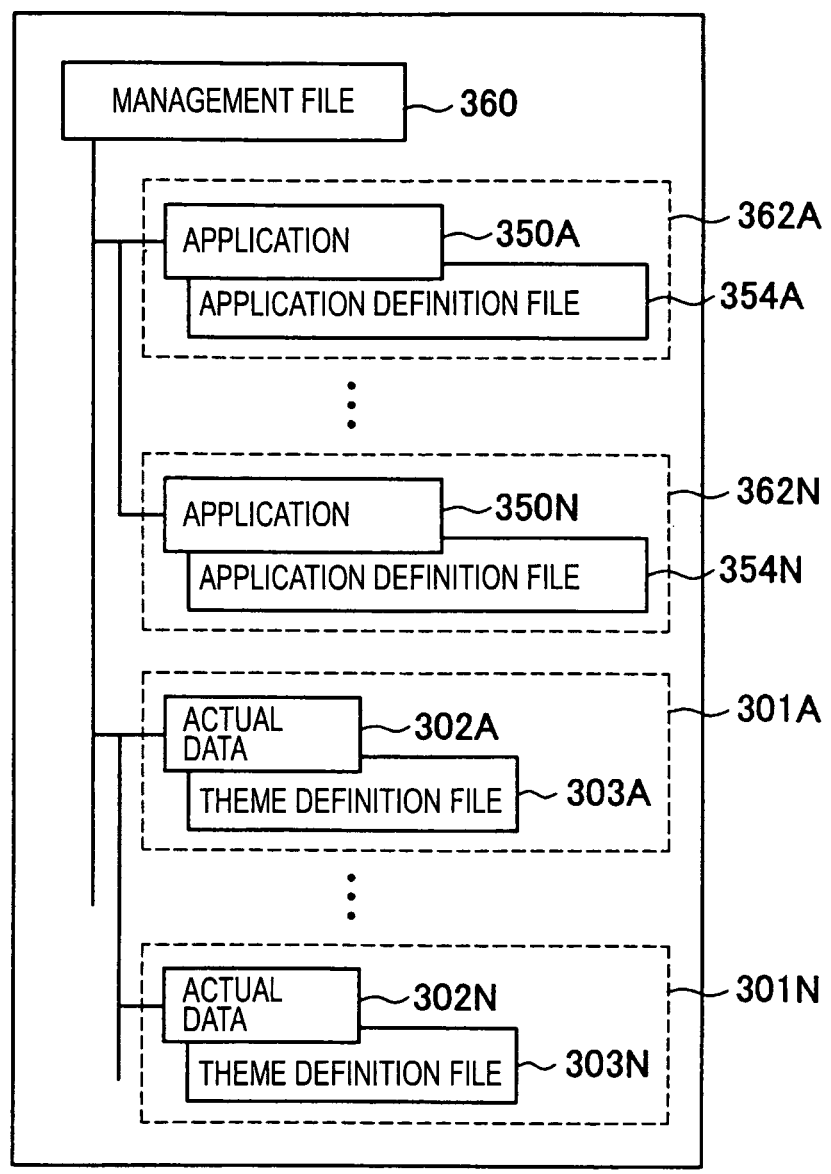
FIG. 7 is a illustration showing the outline of data stored in a storage section of the application download server apparatus according to an embodiment of the present invention.

Next, with reference to FIG. 7, a description will be given of the management file 360 stored in the storage section 123 of the AP server 101 according to this embodiment. FIG. 7 is an illustration showing the outline of data stored in the storage section of the application download server apparatus according to this embodiment.

As shown in FIG. 7, in the storage section 123, a management file (metafile) 360, application data 362, and theme data 301 are stored.

The management file 360 is metadata related to application data 362 and theme data 301. Therefore, even if access is not made to the application data 362 or the theme data 301, if access is made to the management file 360, whether or not the target data has been stored, the attributes thereof can be known.

One or more pieces of the application data 362 exists, for example, for each version, as in application data 362A, application data 362B, . . . , and application data 362N (hereinafter they may be referred to collectively as "application data 362").

Furthermore, each piece of application data 362 contains an application 350 and an application definition file 354.

On the other hand, one or more pieces of the theme data 301 exists, for example, for each version or for each identification information such as a theme name, as in theme data 301A, theme data 301B, . . . , and theme data 301N (hereinafter they may be referred to collectively as "theme data 301").

Furthermore, each piece of theme data 301 contains actual data 350, such as image data or sound data related to each theme, such as a screen theme and a sound theme, and a theme definition file 354.

The management file 360 according to this embodiment has been described by using as an example a case in which the management file 360 is one file. However, the management file 360 is not limited to such an example, and it can be embodied even when, for example, the management file 360 is divided into a plurality of files as management files 360 (360A, 360B, . . . , 360N). In such a case, for example, the file corresponding to the application data 362A and the theme data 301A is the management file 360A, and the file corresponding to the application data 362D and the theme data 301D is the management file 360D. As a consequence, as a result of being formed of a plurality of management files 360, the time necessary to process the management file 360, such as the time necessary to refer to and update the management file 360, can be greatly shortened.

Data Structure

Next, with reference to FIGS. 8A, 8B, and 8C, a description will be given of the structure of various kinds of files or data according to this embodiment. FIGS. 8A, 8B, and 8C are illustrations schematically showing data structures according to this embodiment.

As shown in FIG. 8A, the management file 360 contains theme identification information, a version, and actual data access information.

The theme identification information is identification information by which a theme can be identified. Examples of the theme identification information can include a theme name and an ID number. Furthermore, the actual data access information is information in which path information by which access can be made to the actual data 302, such as actual images, sound, and text, is described.

The "version" of the management file 360 may always indicate the most recent version. Such version of the management file 360 serves as both a version related to a theme and a version related to an application. More specifically, the version at which output of the application definition file 354 is possible, in which the version of the management file 360 is the origin, can serve as a determination reference when a theme is output and can also become the version of the application 350. Then, when the theme data is downloaded from the AP server 101, the version of the management file 360 is set in the version of the theme definition file 303, thereby also serving as the version related to the theme. The version is not limited to such an example. For example, the version of the management file according to this embodiment may be managed further individually as two versions, that is, an application version indicating a version of the application and a theme version indicating the version of the theme.

As shown in FIG. 8B, the application definition file 354 contains theme identification information and the version at which output is possible. Furthermore, the application definition file 354 also contains the application version indicating the version of the application.

On the basis of the theme identification information described in the application definition file 354, since theme data is not stored when the application is started up for the first time, the theme data 301 corresponding to the theme identification information is downloaded to the portable communication device 103.

As shown in FIG. 8C, the theme data 301 contains the theme identification information, the theme version, and the actual data 302.

Theme Change Process

Figure 9:
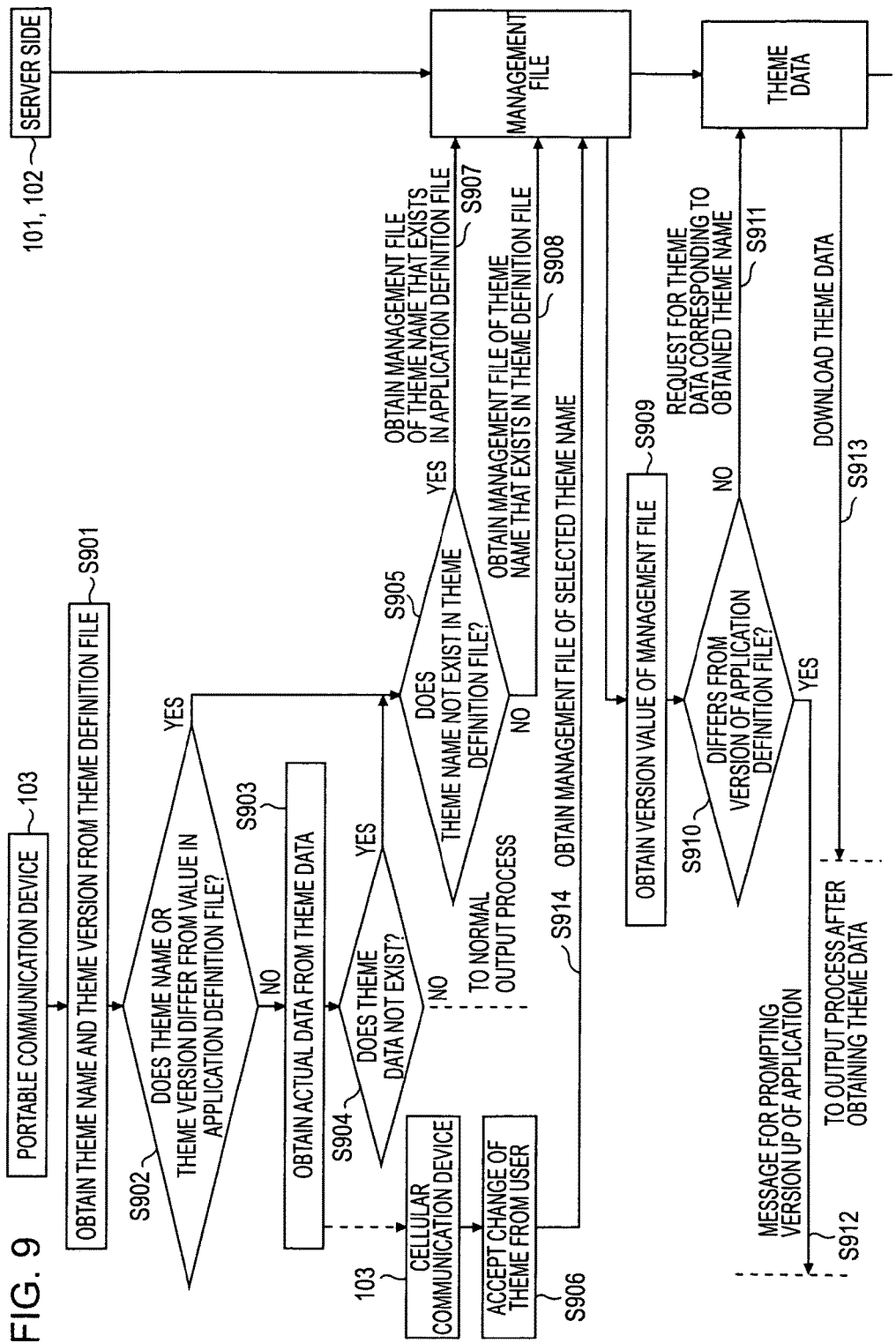
FIG. 9 is a sequence diagram showing the outline of a theme change process according to an embodiment of the present invention.

Next, with reference to FIGS. 9 and 10, a description will be given of a theme change process in the theme change system 100 according to this embodiment. FIG. 9 is a sequence diagram showing the outline of the theme change process according to this embodiment. FIG. 10 is an illustration schematically showing a variation of the theme change process according to this embodiment.

Theme Change Process According to First Embodiment

First, with reference to FIG. 9, a description will be given of a theme change process that is performed when the application 350 stored in the portable communication device 103 is to be changed.

As shown in FIG. 9, when an application change process is instructed by the user via the input section 262 in order to update the version of the application 350, the theme request module 356 obtains the theme name and the theme version of the theme definition file 303 stored in the storage section 258 of the portable communication device 103 (S901).

Next, when the obtained theme name or the obtained theme version differs from the theme name or the theme version described in the application definition file 354 (S902), the theme request module 356 confirms whether or not the theme name is in the theme definition file 303 (S905).

On the other hand, when the theme names and the theme versions match each other (S902), the theme request module 356 obtains the actual data 302 from the theme data 301 stored in the storage area 352 (S903).

However, when the actual data 302 does not exist (S904), the theme request module 356 confirms whether or not the theme name is in the theme definition file 303 (S905). When the actual data 302 exists (S904), a normal theme output process is performed.

When the theme name does not exist (S905), on the basis of the theme name described in the application definition file 354 possessed by the portable communication device 103 itself, the theme request module 356 accesses the AP server 101 in order to request the management file 360 corresponding to the theme name.

The AP server 101 obtains the management file 360 corresponding to the theme name and transmits it to the portable communication device 103, which is the request source.

When the management file 360 obtained by the AP server 101 is transmitted via the communication network 106, the theme management module of the portable communication device 103 obtains the management file 360 (S907).

On the other hand, when the theme name exists (S905), on the basis of the theme name described in the theme definition file 303 recorded in the storage area 352 of the portable communication device 103, the theme request module 356 accesses the AP server 101 in order to request the management file 360 corresponding to the theme name.

The AP server 101 obtains the management file 360 corresponding to the theme name and transmits it to the portable communication device 103, which is the request source.

When the management file 360 obtained by the AP server 101 is transmitted via the communication network 106, the theme management module 358 of the portable communication device 103 obtains the management file 360 (S908).

Next, the theme management module 358 refers to the version described in the theme definition file 303 contained in the obtained (S907 or S908) management file 360 and obtains the version (S909).

Therefore, the theme management module 358 compares the obtained version with the version at which output is possible value described in the application definition file 354 stored by the portable communication device 103 itself. When they differ (S910), the theme management module 358 outputs a message that the version of the application 350 is updated on the screen. When an acknowledgement instruction is received from the user, the theme management module 358 downloads the application 350 of a new version from the AP server 101, thereby performing a version up (S912). The case where the above-described versions differ (S910) refers to a case in which, for example, the version on the management file 360 side is newer than the version at which output is possible, but it is not limited to such an example.

On the other hand, when the above-described versions match (S910), the theme management module 358 makes a request for the theme data 301 corresponding to the theme name that is already obtained in the process of step S907 or S908 to the AP server 101 via the communication network 106 (S911).

The AP server 101 transmits the theme data 301 corresponding to the theme name to the portable communication device 103 via the communication network 106. Therefore, the theme management module 358 downloads the theme data 301 and replaces the theme data 301 that already exists in the storage section 258 with the downloaded theme data 301 or newly stores it (S913).

When the theme data 301 is newly stored in the storage section 258, the application 350 performs a theme output process on the basis of the theme definition file 354 contained in the changed theme data 301 and outputs the theme to the output section 260.

This completes the description of the theme change process according to the first embodiment. Such a theme change process has the advantages described below.

(1) In the change process of the application 350, when the version at which output is possible and the version on the management file 360 side are the same as each other, the application 350 is not changed and the application definition file 354 is also not changed, and the AP server 101 side transmits a plurality of types of theme data 301 whose versions are the same and whose theme names are different to the portable communication device 103. As a result, the portable communication device 103 can easily change only the theme quickly without burdening the user. That is, if the theme is changed on the basis of the preference and personality of the user, the ease of operation for the user is improved, malfunctions are reduced, and thus the processing efficiency of the portable communication device 103 is also improved.

(2) Since the theme can be changed without changing the application 350 and without changing the application definition file 354, the independence of the theme data can be increased, the structure of the application 350 can be simplified, and problems of the application 350 due to bugs or the like can be decreased.

(3) The portable communication device 103 need not store a plurality of pieces of theme data 301, and if access is made to the AP server 101 or the Web server 102 as necessary, the theme data 301 can be received and the theme can be changed. As a consequence, processing for managing a plurality of pieces of the theme data 301 and for switching the theme data 301 to another theme data 301 becomes unnecessary, and furthermore, the storage area of the storage section 258 can be efficiently utilized.

(4) In the change process of the application 350, the portable communication device 103 automatically makes a determination as to which one of the theme change process and the change process of the application 350 is properly performed, and performs it. The whole or part of the inquiries to the user can be omitted, the processing can be performed quickly and efficiently, and thus, a burden on the user, such as operations, can be reduced.

Theme Change Process According to Second Embodiment

Next, with reference to FIG. 9, a description will be given of a theme change process according to a second embodiment of the present invention. In the theme change process according to the second embodiment, first, the application 350 accesses the Web server 102, receives Web page data for changing the theme, and displays it on the screen.

A Web page displayed on the output section 260 will now be described more specifically. For example, one or more theme names are displayed in a list form on the screen, and the user selects the theme name corresponding to a desired theme while viewing the Web page by operating the input section 262.

Next, as shown in FIG. 9, when the selection of the desired theme name is accepted from the user via the input section 262, in order to perform a theme change process in synchronization with that acceptance, the theme request module 356 makes a request for the management file 360 corresponding to the selected theme name via the communication network 106 (S906).

When the theme name is selected, in order that a request for the management file 360 corresponding to the theme name can be made to the Web server 102, for example, a path inside the Web server 102, which indicates the storage destination of the management file 360 corresponding to the theme name, is described in advance in the Web page in such a manner as to be linked with the theme name, but this case is not limited to such an example.

Next, when the Web server 102 obtains the management file 360 corresponding to the theme name requested from the theme request module 356, the Web server 102 transmits it to the portable communication device 103, which is the request source. Therefore, it is possible for the theme management module 358 to obtain the management file 360 (S914). The remaining processing is substantially the same as the theme change process described above according to the first embodiment, and detailed descriptions thereof are not repeated here.

This completes the description of the theme change process according to the second embodiment. Such a theme change process has the advantages described below.

(1) Since an instruction can be directly given to the portable communication device 103 so that the user performs a target theme change, the convenience of operations until the theme change instruction is improved, and furthermore the theme can also be received from not only the AP server 101 but also from the Web server 102. As a consequence, it is possible to select a theme matching the preference of the user from a plurality of themes. As a result of storing the theme data 301 in the Web server 102 and enabling many users to use the theme, it is also possible for the side for producing and providing the theme data 301 to create new business chances on the basis of the income, such as billing on that theme.

(2) The user can instruct the portable communication device 103 to perform a target theme change, and the portable communication device 103 automatically makes a determination as to the necessity of a change process, such as a version up of the application 350 as necessary, and downloads the application 350. As a consequence, the convenience and the ease of operation with respect to the portable communication device 103 can be improved, and the processing efficiency can be improved because the portable communication device 103 can collectively perform a theme change and an application change.

(3) If the Web server 102 is accessed and the theme data 301 is downloaded, the portable communication device 103 can output the theme. Therefore, the process for storing in advance the theme data 301 can be omitted, and also a chance of selecting a theme is given to the user so as to use a theme with a high ease of operation and a high level of affection for the user. As a consequence, malfunctions and irregular operations of the user are decreased, the overall processing efficiency of the portable communication device 103 is improved, and the failure rate is decreased.

Next, as shown in FIG. 10, in the theme change process according to the first and second embodiments, the presence or absence of the theme change process and the presence or absence of the application change process are determined on the basis of the values described in the application definition file 354, the theme definition file 303, and the management file 360. A description of the outline shown in FIG. 10 will be now given below.

As shown in FIG. 10, in a process number 1, a process at the first start up of the portable communication device 103 is shown. At the first start up, the theme data 301 does not exist in the portable communication device 103. Therefore, on the basis of the theme name of "default" described in the application definition file 354, the corresponding theme data 301 is downloaded from the AP server 101 (see "operation" shown in FIG. 10). The application 350 is already downloaded, and the application definition file 354 is stored.

Next, in a process number 2, a process when an instruction for changing an application is accepted from the user as in the theme change process according to the first embodiment is shown. During the application change process, when the theme name is the same between the application definition file 354 and the theme data 301 (or the theme definition file 303), when the version of the management file 360 is the same as the version at which output is possible, and when the version of the management file 360 is newer than the theme version on the portable communication device 103 side, the theme data 301 is downloaded as that of a new version, and the theme is changed (see "operation" shown in FIG. 10). The information of the management file 360 may be always up to date, and the version described in the management file 360 may be always up to date.

Next, in a process number 3, similarly to the process number 2, a process when an instruction for changing an application is accepted from the user is shown. During the application change process, since the theme name and the theme version described in the theme definition file on the portable communication device 103 side are the same as those of the management file 360, the theme change process is not performed. Furthermore, since the version at which output is possible on the portable communication device 103 side is the same as the version of the management file 360, the application 350 is also not changed.

In a process number 4, a process when an instruction for changing a theme is directly accepted from the user as in the theme change process according to the second embodiment. Therefore, first, in the theme change process, when the theme name is changed from a default to 01, since the version at which output of the portable communication device 103 is possible is older than the version of the management file 360, a theme change is also performed by updating the version of the application 350.

Similarly to the foregoing, in a process number 5, a process when an instruction for changing a theme is directly accepted from the user is shown. Therefore, a theme change process is performed. More specifically, as shown in FIG. 10, the theme name of the theme definition file 303 is changed from 01 to 02, and the theme data 301 corresponding to the theme name "02" is downloaded. An application change is not performed because the version is the same.

Finally, in a process number 6 shown in FIG. 10, a process when an instruction for changing an application is accepted from the user as in the theme change process according to the first embodiment is shown. Since the theme version of the theme definition file 303 is older than the version of the management file 360, first, the theme data is downloaded, and the theme is changed (see "operation" shown in FIG. 10). The change of the application 350 is not performed because the version at which output is possible is the same as the version of the management file 360.

As shown in FIGS. 9 and 10, in the theme change process according to this embodiment, a description is given by using, as an example, a case in which the theme name is used. However, the theme change process is not limited to such an example as long as theme identification information by which the theme data can be identified is used. For example, even if an ID number is used, the theme change process can be embodied.

The above-described series of processing can be performed by dedicated hardware and can also be performed by software. When the series of processing is to be performed by software, programs forming the software are installed into an information processing apparatus, such as a general-purpose computer or a microcomputer, and the information processing apparatus is made to function as the AP server 101, the Web server 102, or the portable communication device 103.

The programs can be recorded in advance in the storage section 123, the storage section 258, the ROM 122, the RAM 124, etc., serving as a recording medium incorporated in the computer.

Alternatively, the programs may be temporarily or permanently stored (recorded), in addition to a hard disk, in a removable recording medium such as a flexible disk, a CD-ROM (Compact Disc Read Only Memory), a MO (Magneto-optical) disc, a DVD (Digital Versatile Disc), a magnetic disk, or a semiconductor memory. Such a removable recording medium can be provided as commonly-called packaged software.

In addition to being installed into a computer from the above-described removable recording medium, programs may be transferred wirelessly from a download site to a computer via an artificial satellite for digital satellite broadcasting or may be transferred by wire to a computer via a communication network, such as a LAN (Local Area Network) or the Internet, and in the computer, the programs which are transferred in such a manner can be received and installed into the incorporated storage section 124 or the incorporated storage section 258.

In this specification, the processing steps describing the program by which the computer performs various processes do not have to be executed chronologically according to the written orders in flowcharts, and they may include processes which are executed concurrently or individually (for example, concurrent processes or object-oriented processes).

The programs may be processed by one computer and may also be processed in a distributed manner by a plurality of computers.

The embodiments have been described by using, as an example, a case in which the theme request module 356 and the theme management module 358 provided in the portable communication device 103 are formed of software, but the present invention is not limited to such an example. For example, each of the above-described sections may be hardware formed of one or more elements or circuits.

In the theme change system 100 according to this embodiment, a communication using the portable communication device 103 and the like targets a wireless communication, but the present invention is not limited to such an example. For example, a communication using the portable communication device 103 and the like can be applied to a wired communication and a communication in which a wireless connection and a wired connection coexist.

While preferred embodiments of the present invention have been described with reference to the attached drawings, the present invention is not limited to such embodiments. It will be obvious to those skilled in the art that various changes and modifications can be made within the technical scope of the appended claims, and it is to be understood that all such changes and modifications fall within the technical scope of the present invention.

What is claimed is:

1. A theme change system comprising:
   a portable communication device connected to a server apparatus via a communication network,
   wherein the server apparatus includes
      a transmission section that transmits an application data relating to an application, an application definition data file relating to attributes of the application, a theme data relating to a theme, a theme definition data file relating to attributes of the theme, and a management file relating to the application and the theme, to the portable communication device, wherein the application is executable to perform a predetermined process, wherein the portable communication device includes
an application data storage section that stores the application data,
a theme data storage section that stores the theme data,
a management data storage section that stores the management file,
a theme management section that compares a version value of the stored theme data with a version value of the management file obtained from the server apparatus, and
an interface output section that outputs an interface of the portable communication device on the basis of the theme and a result of the comparison, wherein execution of the predetermined process by the application operates independently from the theme such that the portable communication device is configured to change the theme during the execution of the predetermined process, without changing the application and without changing the application definition data file, and wherein the application is not integral with the theme.

2. The theme change system according to claim 1, wherein the server apparatus includes an application download server that is configured to store and transmit the application data relating to the application and the theme data relating to the theme to the portable communication device.

3. The theme change system according to claim 2, wherein the server apparatus further includes a Web server that is configured to provide Web page browsing to the portable communication device.

4. The theme change system according to claim 3, wherein if the Web server stores the theme data and the theme data is requested through a browser of the portable communication device, the Web server is configured to perform a theme change in place of the application download server.

5. The theme change system according to claim 1, wherein the portable communication device further includes a theme request section that makes a request for the theme data in accordance with a request from the user to the server apparatus via the communication network.

6. The theme change system according to claim 5, wherein the theme management section determines whether the theme data requested by the theme request section should be received and, if it is determined that the theme data should be received, receives the theme data transmitted from the server apparatus via the communication network, and stores the theme data in the storage section.

7. The theme change system according to claim 5, wherein, when an interface cannot be output on the basis of the theme data stored by the portable communication device, the theme request section makes a request to the server apparatus for new theme data.

8. A portable communication device capable of communicating with a server apparatus via a communication network, the portable communication device comprising:

an application data storage section that stores an application data relating to an application and an application definition data file relating to attributes of the application, the application being executable to perform a predetermined process,
a theme data storage section that stores a theme data relating to a theme and a theme definition data file relating to attributes of the theme,
a management data storage section that stores a management file relating to the application and the theme,
a theme management section that compares a version value of the stored theme data with a version value of the management file obtained from the server apparatus, and
an interface output section that outputs an interface of the portable communication device on the basis of the theme and a result of the comparison, wherein execution of the predetermined process by the application operates independently from the theme such that the portable communication device is configured to change the theme during the execution of the predetermined process, without changing the application and without changing an application definition data file, the application definition data file including data regarding attributes of the application, and wherein the application is not integral with the theme.

9. The portable communication device according to claim 8, wherein the portable communication device further includes a theme request section that makes a request for the theme data in accordance with a request from the user to the server apparatus via the communication network.

10. The portable communication device according to claim 9, wherein the theme management section determines whether the theme data requested by the theme request section should be received and, if it is determined that the theme data should be received, receives the theme data transmitted from the server apparatus via the communication network, and stores the theme data in the storage section.

11. The portable communication device according to claim 10, wherein, when an interface cannot be output on the basis of the theme data stored by the portable communication device, the theme request section makes a request to the server apparatus for new theme data.

12. The portable communication device according to claim 10, wherein the theme management section replaces the existing theme data stored by the portable communication device with the theme data transmitted from the server apparatus.

13. The portable communication device according to claim 10, wherein, when a selection of the theme data is accepted from the user on the basis of the identification information for identifying the theme data, the theme request section makes a request for the selected theme data to the server apparatus.

14. The portable communication device according to claim 10, wherein, in an attribute definition file including the application definition data file for at least defining attributes of the application, a version at which an interface output section can output an interface is described, and the interface output section outputs the interface by comparing the version at which output is possible with the version value of the stored theme data.

* * * * *